United States Patent
Biebel et al.

(10) Patent No.: US 8,757,702 B2
(45) Date of Patent: Jun. 24, 2014

(54) PLASTIC VEHICLE-INTERIOR-PART WITH AN IMPACT MODULE

(75) Inventors: James D. Biebel, Milford, MI (US); Edward C. Harrison, Canton, MI (US); Robert E. Wilson, Brighton, MI (US); Brian Zaharia, South Lyon, MI (US); Mike Corvino, Canton, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 13/642,156

(22) PCT Filed: Apr. 20, 2011

(86) PCT No.: PCT/US2011/033148
§ 371 (c)(1),
(2), (4) Date: Nov. 21, 2012

(87) PCT Pub. No.: WO2011/133613
PCT Pub. Date: Oct. 27, 2011

(65) Prior Publication Data
US 2013/0200651 A1    Aug. 8, 2013

Related U.S. Application Data

(60) Provisional application No. PCT/US2011/033148, filed on Apr. 20, 2011, provisional application No. 61/325,914, filed on Apr. 20, 2010.

(51) Int. Cl.
*B60R 21/055* (2006.01)
*B60N 2/60* (2006.01)

(52) U.S. Cl.
CPC ............ *B60R 21/055* (2013.01); *B60N 2/6009* (2013.01)

USPC .................................. 296/187.05; 296/187.12

(58) Field of Classification Search
USPC .................. 296/1.08, 146.7, 187.02, 187.05, 296/187.12, 193.02
See application file for complete search history.

(56) References Cited

U.S. PATENT DOCUMENTS

| | | | |
|---|---|---|---|
| 4,919,470 A | | 4/1990 | Muller |
| 5,685,566 A | | 11/1997 | Hirase et al. |
| 5,803,532 A | * | 9/1998 | Karuppaswamy et al. ........................ 296/187.05 |
| 7,726,727 B2 | * | 6/2010 | Bhattacharjee et al. . 296/187.12 |
| 2004/0256889 A1 | * | 12/2004 | Schonebeck et al. ..... 296/187.02 |
| 2006/0202459 A1 | * | 9/2006 | Friedrich ....................... 280/751 |
| 2007/0262612 A1 | * | 11/2007 | Cowelchuk et al. ...... 296/187.12 |
| 2008/0012384 A1 | * | 1/2008 | Sielhorst et al. ........... 296/146.7 |
| 2008/0246309 A1 | * | 10/2008 | Abe .......................... 296/187.05 |
| 2011/0169302 A1 | * | 7/2011 | Deng et al. ............... 296/187.12 |

FOREIGN PATENT DOCUMENTS

| EP | 0318640 A2 | 6/1989 |
|---|---|---|
| GB | 1169446 A | 11/1969 |
| GB | 2308340 A | 6/1997 |

OTHER PUBLICATIONS

PCT/US2011/033148 Related PCT Application Written Opinion and Search Report mailed Jul. 20, 2011.

* cited by examiner

*Primary Examiner* — Glenn Dayoan
*Assistant Examiner* — Jason S Daniels
(74) *Attorney, Agent, or Firm* — The Dobrusin Law Firm, PC

(57) ABSTRACT

The present invention relates to a plastic vehicle-interior-part with an impact module.

8 Claims, 2 Drawing Sheets

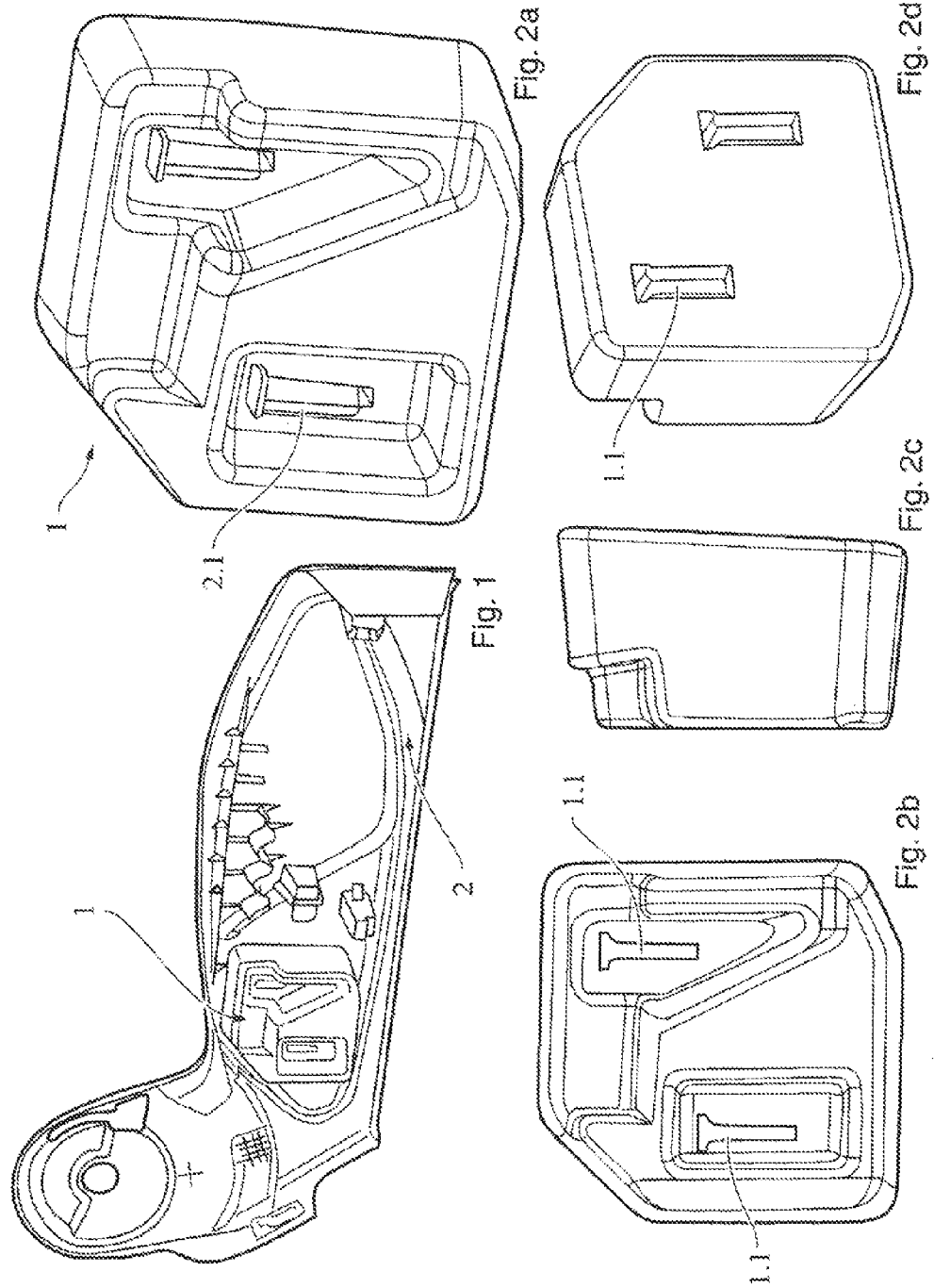

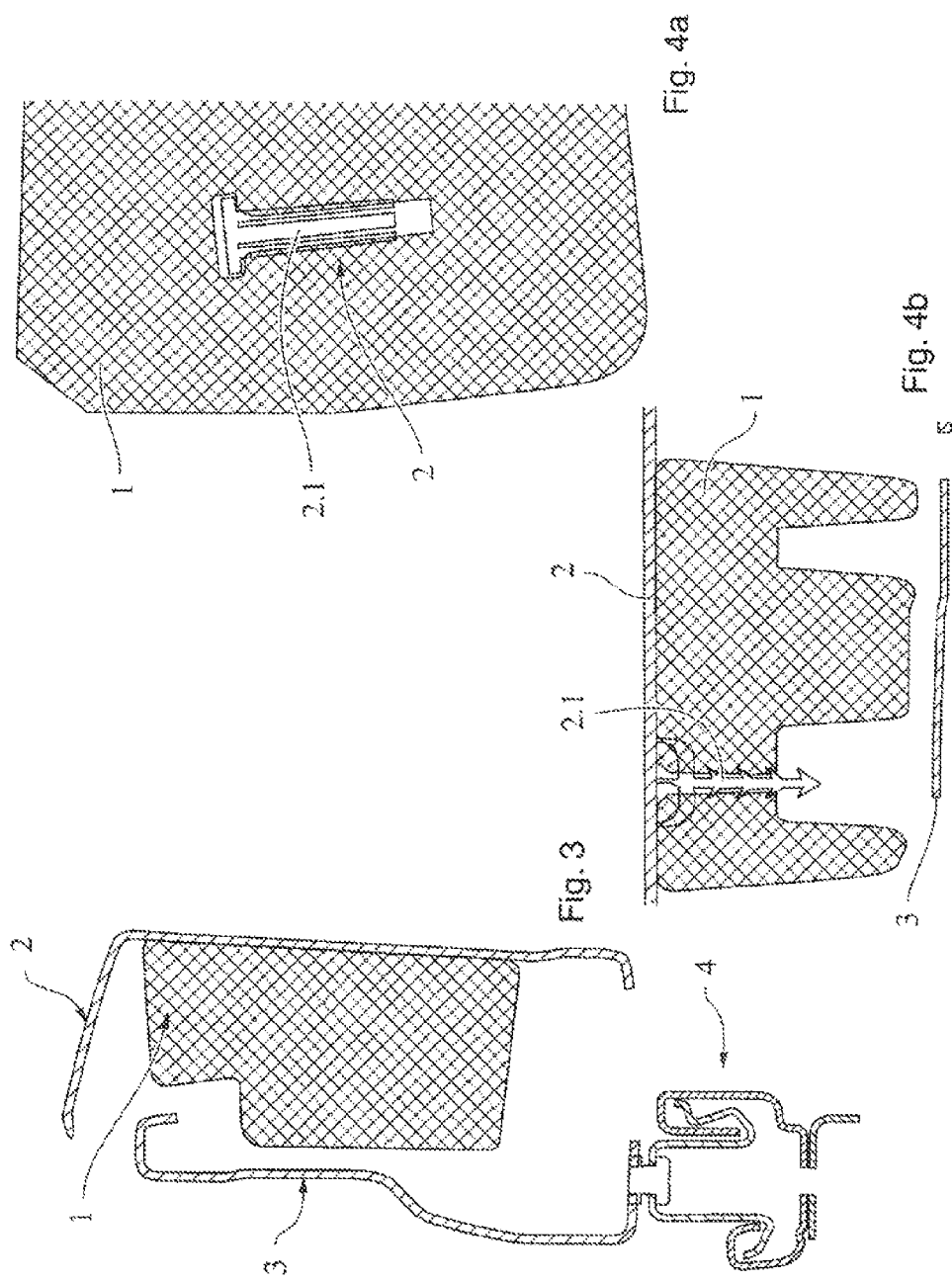

PLASTIC VEHICLE-INTERIOR-PART WITH AN IMPACT MODULE

CLAIM OF PRIORITY

This application claims priority from prom one application Ser. No. 61/325,914 filed 20 Apr. 2010, and is a national application based on PCT Application International Application PCT/US2011/033148, filed 20 Apr. 2011 (published as WO2011/133,613) and claim the benefit of the filing date of 20 Apr. 2011, all incorporated herein by reference.

The present invention relates to a plastic vehicle-interior-part with an impact module.

Plastic vehicle-interior-parts often comprise impact modules, which are used as internal features to prevent excessive deflection of plastic vehicle-interior-parts, for example the valance of a vehicle seat. The impact module's functionality is, for example, to prevent the side valance from deflecting more than 10 mm when subjected to a dynamic seat belt test.

It is therefore the objective of the present invention to provide a plastic vehicle-interior-part with an impact module.

The problem is solved win a plastic vehicle-interior-part with an impact module, whereas the impact module is made from an expanded, plastic foam material.

Preferably, the expanded foam material is an expanded polypropylene. The expanded plastic foam material can be at least partially covered with a coating, preferably a plastic coating, particularly to improve the grade of the surface of the impact module.

Preferably, the impact module has a 3D-shape, whereas particularly the thickness of the impact module varies. Preferably, the shape of the impact module is adapted to the plastic vehicle-part to which it is attached. Preferably, the thickness of the impact module is reduced in its attachment region. Preferably, the impact module comprises a slot, more preferably a T-shaped slot, to attach the impact module to the plastic vehicle-part.

The impact module can be attached to the plastic part by any means known to a person skilled in the art. The impact module can be for example glued to the plastic vehicle-part. The impact module can be molded together with the plastic vehicle-part. However, preferably, the impact module is attached to the plastic vehicle-interior-part by means of a form- and/or force-fitting-means. Preferably, there are two or more means to attach the impact module to the plastic vehicle-part. Preferably, the impact module is attached to the plastic vehicle-part-with one or more plastic barb(s).

The invention is explained in further detail according to FIGS. 1 and 3. These explanations do not limit the scope of protection.

FIG. 1 shows the vehicle-interior-part with the impact module.

FIG. 2 shows the impact module.

FIG. 3 shows the attachment of the vehicle-interior-part to a seat structure.

FIG. 4 shows the attachment of the impact module to the vehicle-interior-part.

FIG. 1 shows the incentive vehicle interior part 2, which is in the present case a side valance of a seat. Attached to this side valance 2 is an impact module 1 which is located in the area where the seat belt is fastened to the structure of the seat. The impact module 1 prevents the side valance 2 from deflecting more than 10 mm when subjected to a dynamic seat belt test (OSI2). The impact module is attached to the side valance by form- and/or force-fitting-means 2.1.

FIGS. 2a-2d show the impact module 1 in different views. As can be seen, the impact module as shaped three dimensionally and has slots 1.1 which allow a form- and/or force-fit between the impact module 1 and the side valance 2. The slot is, in the present case T-shaped, so that the form- and/or force-fitting-means 2.1 can be introduced into the slot at the top of the T and are then drawn or pushed downwards. The impact module is in the present case made from expanded polypropylene. The impact module may, at least partially, comprise a coating of its surface. In the area 1.1, where the impact module 1 is attached to the plastic vehicle-part, it preferably comprises a reduced thickness.

FIG. 3 shows the attachment/of the vehicle interior part 2 to the structure 3 of the seat. As can be seen, the side valance 2 together with the impact module 1 are attached to the side part 3 of the seat frame of a vehicle seat, which is preferably adjustable longitudinally with an upper- and a lower rail 4.

FIGS. 4a and 4b show the attachment of the impact module 1 to the side valance 2. The side valance 2 comprises form- and/or force-fitting-means here plastic barbs 2.1, which are inserted into the slots 1.1 of the impact module 1. Due to these barbs, a form- and/or a force-fit between the impact module 1 and the side valance 2 is realized. The form- and/or force-fitting-means 2.1 can be attached to the side valance 2 or the side valance 2 and the form- and/or force-fitting-means 2.1 can be provided as one piece, for example produced during one molding process.

LIST OF REFERENCE SIGNS 1 impact module
1.1 area of attachment, slot
2 vehicle-interior-part, valance
2.1 form-fitting-means, plastic barb
3 metal structure of the seat
4 upper-, lower-rail

The invention claimed is:

1. A plastic vehicle-interior-part comprising a side valence adapted to be attached to a seat frame with an impact module, wherein the impact module is made from an expanded plastic foam material being an expanded polypropylene, wherein the impact module is attached to the plastic vehicle-interior-part by one or more plastic barbs and the impact module comprises one or more T shaped slots to attach the impact module to the plastic vehicle-interior part, wherein the T shape of the one or more T shaped slots passes through the impact module from a side facing the plastic vehicle-interior part towards the seat frame; and the side valence and the one or more plastic barbs comprise one piece.

2. A plastic vehicle-interior-part according to claim 1, characterized in, that the foam material is at least partially coated with a plastic material to improve the grade of the surface.

3. A plastic vehicle-interior-part according to claim 1 wherein a location of the one or more slots in the impact module have a reduced thickness.

4. A plastic vehicle-interior part according to claim 1 wherein the side valence is adjustable longitudinally with an upper and a lower rail.

5. A plastic vehicle-interior-part comprising a side valence adapted to be attached to a seat frame with an impact module, wherein the impact module is made from an expanded plastic foam material, wherein the impact module is attached to the plastic vehicle-interior-part by one or more plastic barbs and the impact module comprises one or more T shaped slots to attach the impact module to the plastic vehicle-interior part, wherein the T shape of the one or more T shaped slots passes through the impact module from a side facing the plastic vehicle-interior part towards the seat frame, and the side valence and the one or more plastic barbs comprise one piece.

6. A plastic vehicle-interior-part according to claim 5, characterized in, that the foam material is at least partially coated with a plastic material to improve the grade of the surface.

7. A plastic vehicle-interior-part according to claim 5 wherein a location of the one or more slots in the impact module have a reduced thickness.

8. A plastic vehicle-interior part according to claim 5 wherein the side valence is adjustable longitudinally with an upper and a lower rail.

* * * * *